(12) United States Patent
Schicora et al.

(10) Patent No.: US 11,584,199 B2
(45) Date of Patent: Feb. 21, 2023

(54) PASSENGER RETENTION SYSTEM AND METHOD

(71) Applicant: SUNSET VANS, INC, Corona, CA (US)

(72) Inventors: Eric Schicora, Orange, CA (US); Derek Murray, Corona, CA (US)

(73) Assignee: Sunset Vans, Inc., Corona, CA (US)

( * ) Notice: Subject to any disclaimer, the term of this patent is extended or adjusted under 35 U.S.C. 154(b) by 391 days.

(21) Appl. No.: 16/775,193

(22) Filed: Jan. 28, 2020

(65) Prior Publication Data

US 2021/0229532 A1    Jul. 29, 2021

(51) Int. Cl.
| | |
|---|---|
| *B60J 1/00* | (2006.01) |
| *B60J 1/10* | (2006.01) |
| *B62D 65/06* | (2006.01) |
| *B29C 65/48* | (2006.01) |
| *B29L 31/30* | (2006.01) |

(52) U.S. Cl.
CPC ............ *B60J 1/006* (2013.01); *B29C 65/48* (2013.01); *B60J 1/007* (2013.01); *B62D 65/06* (2013.01); *B29L 2031/3052* (2013.01)

(58) Field of Classification Search
CPC ... B60J 1/10; B60J 1/006; B60J 1/007; B62D 65/06; B29L 2031/3052; B29C 65/48
See application file for complete search history.

(56) References Cited

U.S. PATENT DOCUMENTS

| | | | | |
|---|---|---|---|---|
| 7,152,906 | B1 * | 12/2006 | Farrar ................... | B63B 19/02 52/204.5 |
| 8,029,040 | B2 * | 10/2011 | Perrin ..................... | B60J 1/10 296/211 |
| 9,097,058 | B2 | 8/2015 | Saucier et al. | |
| 9,205,722 | B2 * | 12/2015 | Sitko ...................... | B60J 1/004 |
| 10,752,095 | B2 * | 8/2020 | Howard .................. | B60J 1/007 |
| 2004/0251714 | A1 * | 12/2004 | Hintzke .................. | B60J 1/10 296/146.15 |
| 2006/0232093 | A1 * | 10/2006 | Boehm ............. | B32B 17/10761 296/96.21 |
| 2011/0192091 | A1 * | 8/2011 | Smith ..................... | B60J 1/16 49/504 |

(Continued)

OTHER PUBLICATIONS

How Window Security Film Works; Window Film: A Window of Opportunity by Rachael Zimmermann; https://www.facilitiesnet.com/security/topic/How-Window-Security-Film-Works--18511, 2019.

*Primary Examiner* — Gregory A Blankenship
(74) *Attorney, Agent, or Firm* — Alexander Pokot; AP Patents

(57) ABSTRACT

A method and a system are provided for retaining a side window in a vehicle to meet FMVSS No. 226 standard, where the side window is being secured to an exterior surface of a vehicle body. An optically transparent flexible film laminate is adhered to a visible interior surface of the side window. The optically transparent flexible film laminate has a thickness of between about 0.005 inches and about 0.020 inches. A peripheral edge of the optically transparent flexible film laminate is bonded to an interior surface of the vehicle body. The bonding agent overlaps the peripheral edge and the interior surface at a distance of at least 0.5 inches. The bonding agent can be a Sikaflex-552 adhesive.

24 Claims, 3 Drawing Sheets

(56) References Cited

U.S. PATENT DOCUMENTS

| | | | |
|---|---|---|---|
| 2015/0298527 A1* | 10/2015 | Sitko | B60J 1/10 296/201 |
| 2015/0298656 A1* | 10/2015 | Pascoe | H04R 1/028 381/86 |
| 2021/0188055 A1* | 6/2021 | Komoriya | B60J 1/10 |
| 2021/0229532 A1* | 7/2021 | Schicora | B29C 65/48 |

* cited by examiner

Detail A

PASSENGER RETENTION SYSTEM AND METHOD

CROSS-REFERENCE TO RELATED APPLICATIONS

N/A

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to windows for vehicles. It further relates to passenger transit vehicle window retrofit in order to meet FMVSS No. 226 standard requirements.

BRIEF DESCRIPTION OF THE DRAWINGS

The accompanying drawings are incorporated in and constitute part of the specification and illustrate various embodiments. In the drawings.

DETAILED DESCRIPTION OF EXEMPLARY EMBODIMENTS

Figure 1:
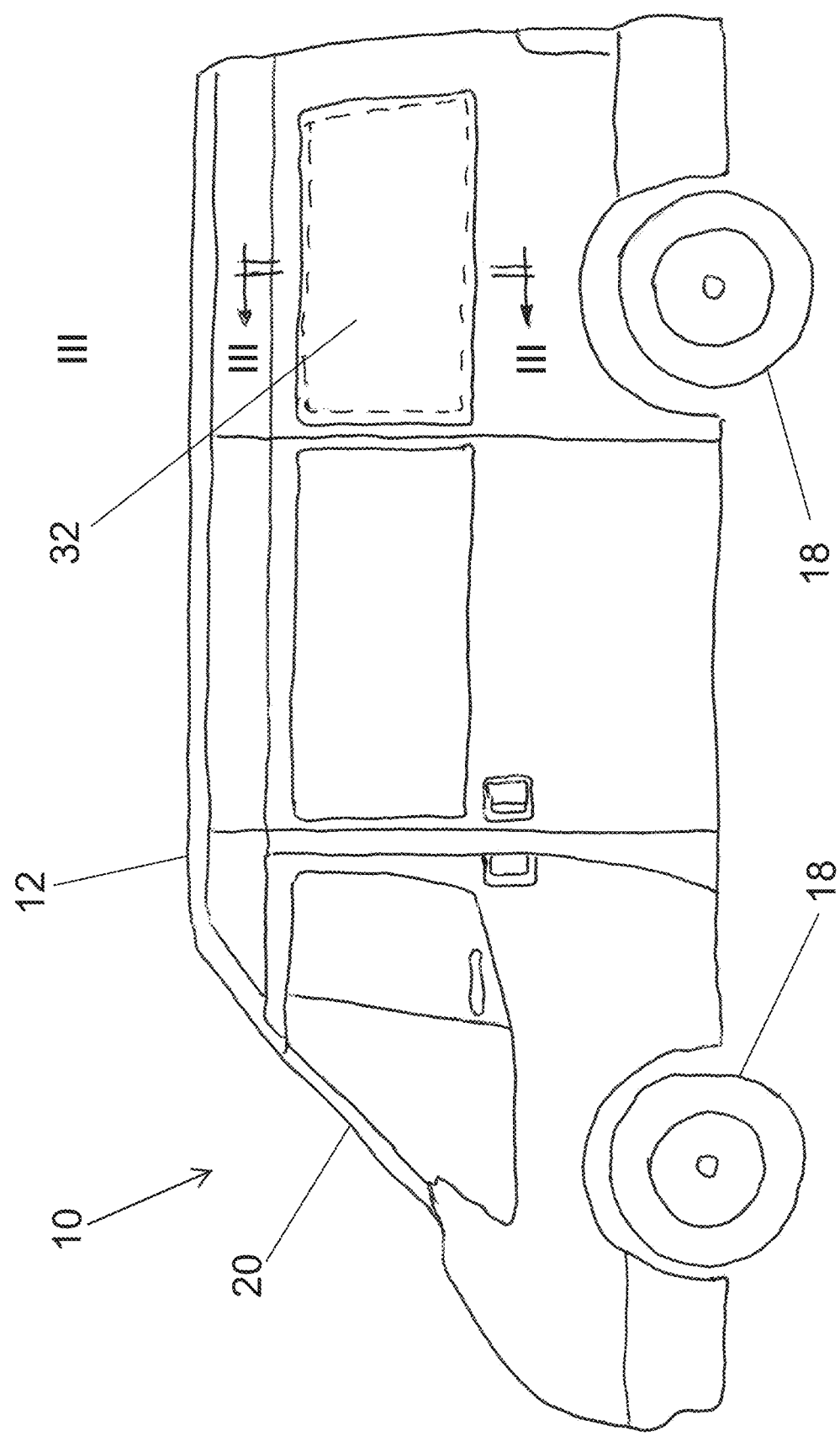
FIG. 1 illustrates an elevation side view of a vehicle.

Prior to proceeding to the more detailed description of the present subject matter, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

The purpose of the Abstract of this Specification is to enable the U.S. Patent and Trademark Office and the public generally, and especially the scientists, engineers and practitioners of the art who are not familiar with patent or legal terms or phrasing, to determine quickly from a cursory inspection the nature and essence of the technical disclosure of the application. The Abstract is not intended to be limiting as to the scope of the subject matter in any way.

In the following description, numerous specific details are given in order to provide a thorough understanding of the present embodiments. It will be apparent, however, to one having ordinary skill in the art, that the specific detail need not be employed to practice the present embodiments. On other instances, well-known materials or methods have not been described in detail in order to avoid obscuring the present embodiments. When limitations are intended in this Specification, they are made with expressly limiting or exhaustive language.

Reference throughout this Specification to "one embodiment", "an embodiment", "one example" or "an example" means that a particular feature, structure, or characteristic described in third member with the embodiment or example is included in at least one embodiment of the present embodiments. Thus, appearances of the phrases "in one embodiment", "according to an embodiment", "in an embodiment", "one example", "for example", "an example", or the like, in various places throughout this Specification are not necessarily all referring to the same embodiment or example. Furthermore, the particular features, structures, or characteristics may be combined in any suitable combinations and/or sub-combinations in one or more embodiments or examples.

Similarly, it should be appreciated that in the description of embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The terms "comprises", "comprising", "includes", "including", "has", "having", "could", "could have" or their grammatical equivalents, are used in this Specification to mean that other features, components, materials, steps, etc. are optionally present as a non-exclusive inclusion. For instance, a device "comprising" (or "which comprises") components A, B, and C can contain only components A, B, and C, or can contain not only components A, B, and C but also one or more other components. For example, a method comprising two or more defined steps can be carried out in any order or simultaneously, unless the context excludes that possibility; and the method can include one or more other steps which are carried out before any of the defined steps, between two of the defined steps, or after all the defined steps, unless the context excludes that possibility. Anywhere the term "comprising" is used, embodiments and components "consisting essentially of" and "consisting of" are expressly disclosed and described herein.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or"

would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

Examples or illustrations given are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these example or illustrations are utilized will encompass other embodiments, which may or may not be given in this Specification, and all such embodiments are intended to be included within the scope of that term or terms. Language designating such nonlimiting examples and illustrations includes, but is not limited to "for example", "for instance", "etc.", "or otherwise", and "in one embodiment."

The phrase "at least" followed by a number is used to denote the start of a range beginning with that number, which may or may not be a range having an upper limit, depending on the variable defined. For instance, "at least 1" means 1 or more.

In this specification. "a" and "an" and similar phrases are to be interpreted as "at least one" and "one or more." In this specification, the term "may" or "can be" or "could be" is to be interpreted as "may, for example." In other words, the term "may" is indicative that the phrase following the term "may" is an example of one of a multitude of suitable possibilities that may, or may not, be employed to one or more of the various embodiments.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

The particular embodiments of the present disclosure generally provide system and methods directed to transit van window retrofit in order to meet FMVSS No. 226 standard requirements.

In particular embodiments, a method comprises adhering flexible film laminate to a side window and bonding a peripheral edge of the flexible film laminate to an interior surface of the vehicle body.

In particular embodiments, the method comprises in situ retrofit of the side window.

In particular embodiments, the method uses a Sikaflex 552 adhesive.

Figure 2:
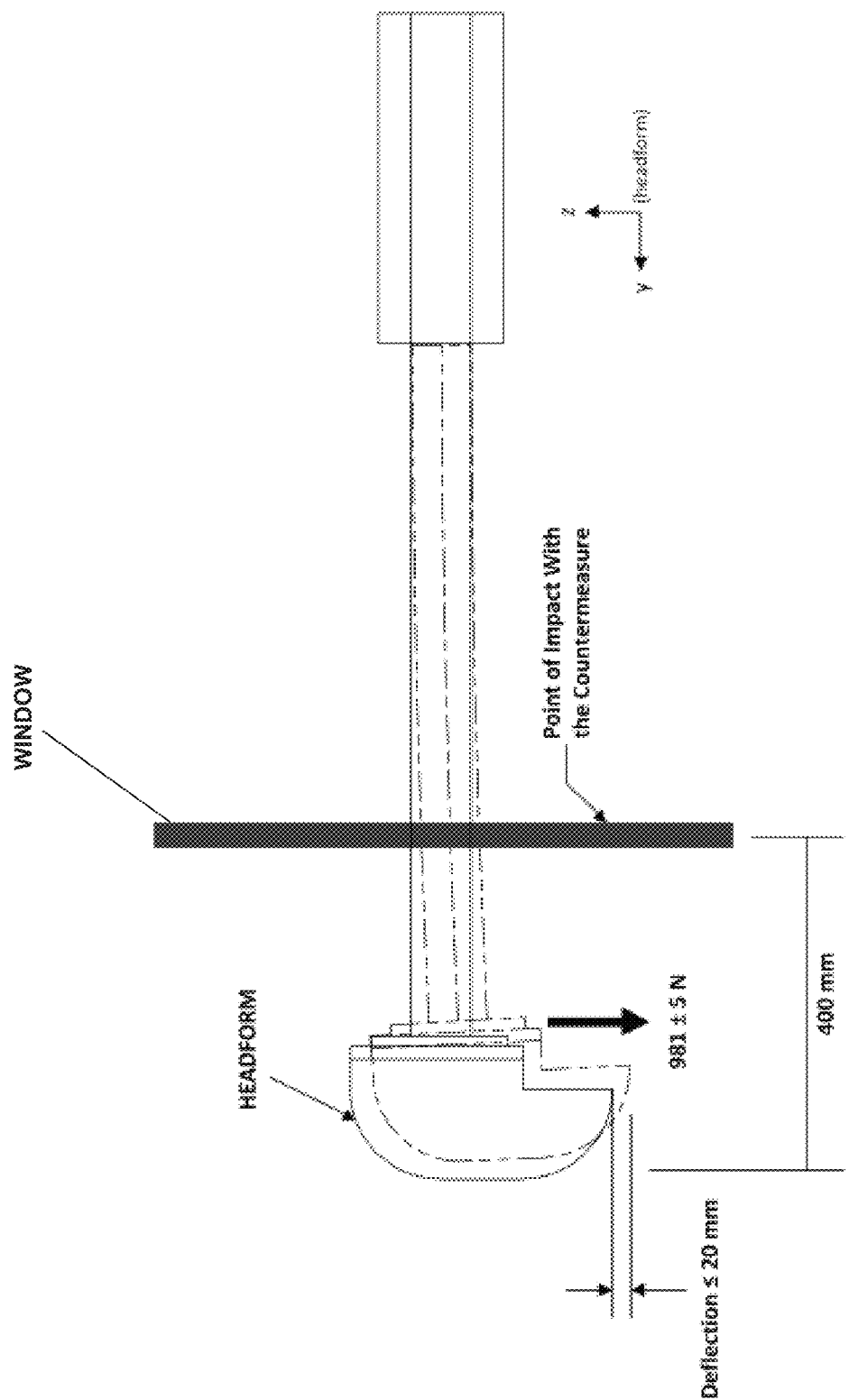
FIG. 2 illustrates an arrangement of a test procedure employed for testing compliance of the side window retention mitigation in the vehicle of FIG. 1.
Figure 4:
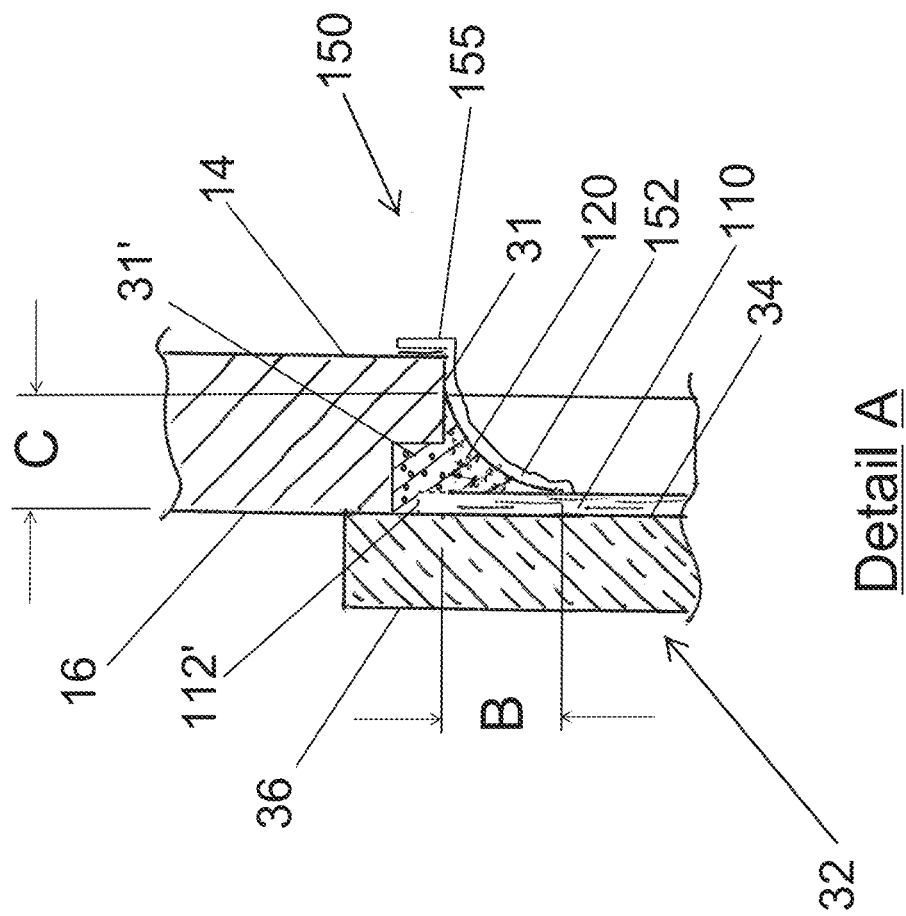
FIG. 4 illustrates an enlarged partial view of FIG. 3.
Figure 3:
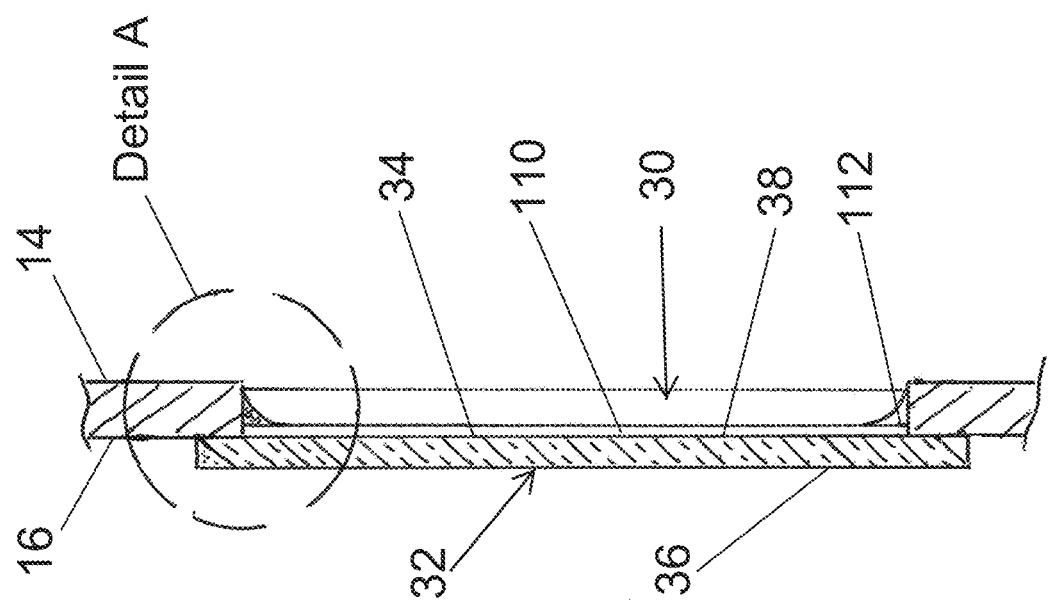
FIG. 3 illustrates a partial cross-section of the vehicle along lines III-III in FIG. 1.

Now in a reference to FIGS. 1 and 3-4, therein is illustrated a vehicle 10. It will be understood that the vehicle 10 comprises a vehicle body 12 with an interior surface 14 and an exterior surface 16. The vehicle body 12 is supported on the wheel sets 18. A power train (not shown) propels the vehicle 10. The vehicle 10 comprises a windshield 20. The vehicle 10 also comprises a side opening 30 through a thickness of the vehicle body 12. The vehicle 10 can be first designed and constructed for non-passenger use, for example such as a cargo transport van or a utility van. In such vehicle 10, the side opening 30 in the vehicle 10 that is designated for non-passenger use is generally covered with a plastic or metallic material. The side opening 30 in the vehicle 10 that is designated for non-passenger transit use can be also covered with the window 32, as is best illustrated in FIGS. 3-4. A peripheral edge portion of an interior surface 34 of the window 32 is bonded to the exterior surface 16 of the vehicle 12. The method of bonding the window 32 to the exterior surface 16 is not material to the inventive concepts. The vehicle 10 can be converted from a non-passenger transit use into passenger transit, for example such as a transit van, for the purpose of transporting humans. Such vehicle 10 is being generally adapted with additional interior seats (not shown). The converted passenger transit vehicle 10 can be also adapted with a wheelchair lift (not shown). The side opening 30 in the passenger transit vehicle 10 that is designated for passenger transport, is covered with a window 32. The window 32 can be referred to as a side window, a glazing, a glass/window pane, etc. In either example, the side window 32 is secured, with adhesive, to the exterior surface 16 of the vehicle body 12. The vehicle 10 can be designed and constructed to have more than one opening 30 and, subsequently, more than one window 32. When the vehicle 10 is manufactured for non-passenger use, the window 32 does not have to meet any safety standards. When the vehicle 10 is converted into passenger transit use and weighs less than 10,000 pounds, the side window 32 must comply with (meet the requirements of) a FMVSS No. 226 ejection mitigation standard issued by the U.S. Department of Transportation (DOT) National Highway Traffic Safety Administration (NHTSA). It must be noted that any vehicle 10 is designed and manufactured with the windshield 20 meeting the requirements of the FMVSS No. 226 standard. For the sake of reader's convenience, the test procedure for determining compliance with FMVSS No. 226 standard is briefly described below with a further reference to FIG. 2. The test procedure essentially comprises striking the window 32 with an ejection impactor that has a headform with a mass of a about 18 kilograms (kg). The base shaft must be oriented vertically and parallel to the y-axis of the headform. The headform is a featureless aluminum headform, 203.2 mm tall and 153.9 mm wide, covered with an 11.4 mm thick head skin (49 CFR 571.5). The ejection headform must not deflect downward more than 20 mm in the x-z plane when a 981 N±5 N force is applied in a vertical longitudinal plane, through the y axis of the headform and no more than 5 mm rear of the posterior surface of the headform. The force must be applied once in each of the following headform axes: +z, −z, +x, −x. The static deflection measurement must be made with the ejection impactor extended 400 mm outboard of the theoretical point of impact with the countermeasure (window) and attached to the ejection propulsion mechanism, including any support frame and anchorage. At each ejection impactor orientation of 0, 90, 180 and 270 degrees about the headform y axis, a force measurement is taken to move the ejection impactor 200 mm rearward into the ejection propulsion mechanism at a rate of 50±13 mm per second, starting at a point 400 mm outboard of the theoretical point of impact with the countermeasure. The measurement must be made with the 100 kg±0.5 kg mass attached to the impactor with its center of gravity passing through the axis of motion and within 5 mm of the posterior surface of the headform. The measurement must exclude the force measured over the first 25 mm of travel, and recorded at a minimum frequency of 100 Hz. At each orientation, the force must be measured a total of five (5) consecutive times and averaged. The dynamic coefficient of friction (pk) for the maximum of the force average values must not exceed 0.25 where $pk = F_{max\ of\ force\ avg\ (N)}/9.81$ m/sec2 $(Mass_{ejectionimpactor\ (kg)} + Mass_{attached\ (kg)})$. Prior to striking at each location, a spring-loaded automatic center punch is used to make indentations in an interior surface 24 and an exterior surface 36 of the window 32. The center punch has a punch tip of 5±2 mm diameter (prior to coming to a point) and a spring adjustment to 150±25 N of force to activate the punch. The test is successful when the headform travels less than 100 mm past the original plane of the window 32 during test and the window remains attached to the vehicle body 12.

Now in a further reference to FIGS. 3-4, a method of retaining the side window 32 in a vehicle 10 to meet requirements of the FMVSS No. 226 standard comprises the steps of adhering a window film material 110 (hereinafter referred to as film 110) to a visible portion 38 of the interior surface 34 of the side window 32 and bonding, with a bonding agent 120, a peripheral edge 112 of the film 110 to an interior surface 14 of the vehicle body 12 and, more specifically, to a peripheral edge surface 31 of the side opening 30. It would be understood that interior surface 14 comprises the peripheral edge surface 31. It is to be understood that such peripheral edge surface 31 constitutes a portion of the interior surface 14. The film 110 can be of an anti-intrusion window film as manufactured by MADICO of Pinellas Park, Fla. under model number CL 800 PS SR, which is a multi-ply laminate of optically clear polyester film and an adhesive. The film 110 can be also referred to as a security film. In either embodiment, the film 110 comprises an optically transparent (clear) and thin laminate. It has been found that the FMVSS No. 226 standard is being complied with when the film 110 has a thickness of between about 0.005 inches and about 0.020 inches and when the film 110 is being directly adhered to the interior surface 34. It has been also found that the optimum results in terms of the window deflection and retention have been achieved with the film 110 having a thickness of about 0.008 inches.

The bonding agent 120 can be an adhesive that cures on exposure to atmospheric conditions to form a durable elastomer. In an example, such bonding agent 120 can be a one-component, self-priming, shelf stable, neutral cure, elastomeric adhesive specifically formulated for silicone structural glazing manufactured by Dow Corning of Midland, Mich. under 995 Silicon Structural Sealant brand. In an example, such bonding agent 120 can be a low VOC, high performance, elastic, gap-filling, one-part, silane-terminated polymer structural adhesive manufactured by Sika Corporation of Madison Heights, Mich. under the Sikaflex®-552 adhesive brand. Either adhesive has been found sufficient to achieve test compliance and cure in and open-air environment and without use of any post-curing techniques, for example such as application of any one of heat, infrared light and ultra-violet (UV) light. Either adhesive can be manually applied with a conventional caulking gun. During application, Sikaflex®-552 adhesive has been found as associated with reduced running, sagging and dropping when compared with the Dow Corning 995, particularly when applied to the vertical edges of the window 32 during retrofit.

It has been further found that the bonding agent 120 must sufficiently overlap the peripheral edge 112 of the film 110 and the edge surface 31, as is represented by distances "B" and "C" in FIG. 4. It is to be understood that term "peripheral edge" also includes herein a surface portion of the film 110. It is also to be understood that the term "overlap" or "overlapping" is to mean herein a distance that the bonding agent 120 is in a contact with the film 110 or the vehicle body 12. Satisfactory results have been obtained when values of distances "B" and "C" are in the range from about 0.25 inches to about 1.00 inch. The effective compliance with the current standards has been achieved with the values of each distance "B" and "C" being about 0.5 inches. At these values, the window 32 did not exhibit any rapture of the bond with the exterior surface 16. However, it is not necessary for "B" to be equal to "C".

The method of adhering the film 100 comprises a step of preparing (cleaning) the visible portion 38 of the interior surface 34 of the window 32. The step of preparing comprises the step of spraying water onto the visible portion 38 of the interior surface 34 of the window 32 and then the step of squeezing the water out from the visible portion 38. The water can be from a conventional municipal water supply source. It is contemplated that some water residue may remain on the visible portion 38 of the interior surface 34. Then, adhesive surface of the film 110 is directly positioned onto the visible portion 38 and any air bubbles are removed with any object having a straight edge. Prior to positioning CL 800 PS SR film from Madico, a silicone release liner, when provided, is removed from the adhesive surface of the film 110. The size of the film 110 may exceed the size of the visible portion 38 where at least a portion of the peripheral edge of the film 110 extends past the peripheral edge of the visible portion 38. The portion(s) of the film 100 that extend past the peripheral edge of the visible portion 38 may be removed with a knife or any other suitable cutting implement or may be left in a contact with the peripheral edge surface 31. Thus, it is contemplated herewithin to adhere the film 110 only to the visible surface portion 38 of the interior surface 34 of the side window 32. Then, the peripheral edge 112 of the film 110 is bonded to the peripheral edge surface 31 with the bonding agent 120. The peripheral edge surface 31 of the side opening 30 may be adapted with a peripheral cavity or a void 31'. In this configuration, the peripheral edge 112' of the film 110 will extend past the visible portion 38 into such cavity or a void 31' and the cavity or a void 31' will be filled with the bonding agent 120. Furthermore, the distance "B" can be then taken from the peripheral edge 112'. As it has been explained above, the bonding agent 120 can be applied with a caulking gun (not shown). After the film 110 is bonded, the bond (bonding connection) is allowed to air cure. The air cure time sufficient for the bond to meet the test requirements depends on the environmental conditions. For example, it may take a minimum of 10 days for the bond to sufficiently cure at temperatures being between about 60° F. and about 70° F. and with relative humidity being between 50% and 60%. Lower temperatures and higher humidity can extend the cure time. Use of post-curing devices, for example such as heat lamp, heat gun, UV lamp reduces the cure time. Thus, the method of retrofitting the side window 32 can comprise an optional step of curing the bond with one of heat, infrared light and UV light. It is to be noted that the application of one of heat, infrared light and UV light can start immediately after the bonding step is completed or start after a period of time, for example if change in environmental conditions may increase the originally allocated air cure time.

FIGS. 1 and 3-4 also illustrate a passenger vehicle window retention system that comprises a vehicle body 12 having each of an exterior surface 16 and an interior surface 16; the window 32 being secured, with adhesive, to the exterior surface 16; the above described film 110 being directly adhered to a visible portion 38 of an interior surface 34 of the window 32; and the above described bonding agent 120 positioned in a direct contact with a peripheral edge 112 of the film 110 and in a direct contact with the interior surface 31 of the vehicle body 12.

FIGS. 1 and 3-4 also illustrate a vehicle 10 that comprises a vehicle body 12; the side window 32 being secured, with adhesive, to an exterior surface 16 of the vehicle body 12; the above described film 110, the film 110 being disposed on a visible portion of an interior surface 34 of the side window 32, the film 110 having a thickness of between about 0.005 inches and about 0.020 inches; and the above described bonding agent 120, the bonding agent 120 being disposed in a direct contact with a peripheral edge 112 of the film 110 and in a direct contact with the interior surface 31 of the vehicle body 12.

It is to be understood that the originally installed window 32 is a non-impact resistant window that will not meet requirements of the FMVSS No. 226 standard. In other words, if the originally installed window 32 is to be subjected to the same test as described above, such window will at least separate from the vehicle body 12 and allow a passenger of the vehicle 10 to be partially or completely ejected through the exposed side opening 30. Thus, the inventive concepts also provide a method of converting a non-impact resistant side window in a vehicle 10 to an impact resistant side window, where the side window being secured to an exterior surface 16 of a vehicle body 12. It can be also said that the inventive concepts also provide a method of retrofitting a non-impact resistant side window in a vehicle 10 to an impact resistant side window, where the side window being secured to an exterior surface 16 of a vehicle body 12. In an example, the method comprises the steps of adhering the above described film 110 to a visible interior surface portion 38 of the window 32, the film 110 having a thickness of between about 0.005 inches and about 0.020 inches; and bonding, with the above described bonding agent 120, a peripheral edge 112 of the film 110 to an interior surface 14 of the vehicle body 12. In an example, the method comprises the steps of adhering the above described film 110 to an interior surface of the window, the film 110 having a thickness of between about 0.005 inches and about 0.020 inches; and bonding, with a Sikaflex®-552 adhesive, a peripheral edge 112 of the film 110 to an interior surface 14 of a vehicle body 12; where the Sikaflex 552 overlaps the peripheral edge 112 to a distance of at least 0.5 inches and overlaps the interior surface of the vehicle body to a distance of at least 0.5 inches.

When the above described film 110 is adhered (applied) to the visible portion 38 and the above described bonding agent 120 bonds the film 110 to the vehicle body 12, the film 110 and the bonding agent 120 configure the window 32 in a compliance with the requirements of the FMVSS No. 226 standard. Or, it can be said that the window 32 is configured to pass requirements of the FMVSS No. 226 standard.

It is contemplated herewithin that the window 32 retrofitted with the film 110 and bonding agent 120 may have to be replaced during use of the vehicle 10. It is also contemplated that replacement may be undertaken by personnel with less than desired level of training and/or experience, particularly on vehicles adapted with the void 31'. Accordingly, a hollow frame-shaped support 150 can be provided and installed to assure that a sufficient level of bunding agent has been applied. The support 150 has a generally convex or curved first portion 152 and a second portion 154. The first portion 152 follows a generally concave contour of the bonding agent 120. The second portion 154 overlaps a peripheral portion of the interior surface 14 around the opening 30. When installed, the support 150 is advantageous in sufficiently filling the void 31' with the bonding agent 120, where the first portion 152 can be used in order to apply pressure to the bonding agent 120 and push the bonding agent 120 into the void 31'. Any extra (unneeded) amount of the bonding agent 120 will ooze out beyond edges of the first and second portions, 152 and 154 respectively and can be easily cleaned.

The support 150 can be manufactured from any one of an aluminum material, a steel, an engineered plastic material and any combination thereof.

When installed, the support 150 may be referred to as an internal trim for the window 132.

Thus, the support 150 can function both as an additional assurance for sufficient amount of bunding agent 120 being used as well as an additional support member bonding the film 110 to the vehicle body 12.

Advantageously, the first portion 152 can be configured into a tool to be used during installation of the film 110 to sufficiently pack bonding agent 120 into the void 31'. In such tool, the second portion 154 can be configured into a handle. The first portion 152 of the tool can be also shaped and sized (configured) to assure application of sufficient amount of the bonding agent 120 without strict adherence to the distances "B" and "C" and further assure proper distribution of such bonding agent 120. In other words, the tool eases installation effort of the film 110.

The above described inventive concepts overcome disadvantages associated with conventional approaches used to mitigate passenger ejection during vehicle conversion from a non-passenger transport to a passenger transport. One conventional approach includes use of inflatable devices, such as air bags, to supplement existing safety structure of the vehicle 10. However, such airbags usually require calibration, design, and testing by the original equipment manufacturer (OEM). Such efforts are not feasible for an entity tasked with retrofitting the vehicle 10 into passenger transit use. Furthermore, when the vehicle is equipped with a side wheelchair lift, such side wheelchair lift can interfere with airbags which prevent their effectiveness and limit safety. Additional installed components, such as cabinets, partitions, vehicle conversion components, handles may also interfere with airbags.

Another conventional approach includes replacement of the window glass entirely with a strong and lightweight polycarbonate material. This approach is associated with a greater than desired replacement time effort due to a removal of the installed (bonded) glass and wasteful costs due to discarding the removed glass.

The above inventive concepts achieve compliance with regulatory requirements without removal and replacement of the existing window. In other words, the original window is left in its original installation (in situ) as being bonded to the exterior surface of the vehicle body.

The above inventive concepts further achieve compliance with regulatory requirements without addition of inflatable devices.

The above described inventive concepts also do not require any fasteners to fasten the film to one of the exterior surface 16 and the exterior surface 14 of the vehicle body 12.

The vehicle 10 may also comprise a rear window being bonded to the exterior surface 16. If such rear window is to be also retrofitted to meet the requirements of the FMVSS No. 226 standard, the retrofit can be achieved by the above described method(s).

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

Each of the independent claims becomes restated as an Embodiment A, Embodiment B, . . . ; and each of the dependent claims becomes a Feature 1, Feature 2, . . . . The list of features is introduced with the sentence that Each of the foregoing embodiments A through H may be employed alone or in any combination, and may include any one or more of the following features in any suitable combination.

Embodiment A: A method of retaining a window in a vehicle to meet FMVSS No. 226 standard, the window being secured, with an adhesive, to an exterior surface of a vehicle body, the method comprising the steps: adhering a flexible film laminate to a visible interior surface portion of the window; bonding, with a bonding agent, a peripheral edge of the flexible film laminate to an interior surface of the vehicle body; and air curing a bond between the flexible film laminate and the interior surface for a duration of time sufficient to pass the FMVSS No. 226 standard during testing of the window.

Feature 1: The step of bonding the peripheral edge to the vehicle body comprises the step of selecting the bonding agent as a Sikaflex®-552 adhesive.

Feature 2: The step of bonding the peripheral edge to the vehicle body comprises the step of overlapping at least 0.5 inches of the peripheral edge with the bonding agent.

Feature 3: The step of bonding the peripheral edge to the vehicle body comprises the step of overlapping at least 0.5 inches of the interior surface of the vehicle body with the bonding agent.

Feature 4: The step of adhering the flexible film laminate comprises the step of directly adhering the flexible film laminate to the visible interior surface portion of the window.

Feature 5: The step of adhering the flexible film laminate comprises the step of selecting the flexible film laminate in a thickness of between about 0.005 inches and about 0.020 inches.

Feature 6: The step of adhering the flexible film laminate comprises the step of selecting the flexible film laminate with a thickness of about 0.008 inches.

Feature 7: The method further comprises the step of selecting the flexible film laminate as an optically transparent flexible film laminate.

Feature 8: The method further comprises the step of preparing the visible interior surface portion of the window prior to adhering the flexible film laminate thereto.

Feature 9: The step of preparing the visible interior surface portion of the window comprises the step of spraying water onto the visible interior surface portion and the step of squeezing the water out from the visible interior surface portion.

Feature 10: The method further comprises the step of applying any one of heat, infrared light and ultra-violet light to the bond.

Feature 11: The method further comprises the step of bonding, with the bonding agent, a frame-shaped support prior to the step of air curing the bond.

Feature 12: The method further comprises the step of distributing, with a tool, said bonding agent around said peripheral edge of said flexible film laminate prior to the step of air curing said bond.

Embodiment B: A vehicle window retention system, comprising: a flexible film laminate, the flexible film laminate being directly adhered to a visible portion of an interior surface of a vehicle window; and a bonding agent, the bonding agent being positioned in a direct contact with a peripheral edge of the flexible film laminate and in a direct contact with an interior surface of the vehicle body.

Feature 1: The bonding agent is sized and positioned to overlap the peripheral edge at a distance of at least 0.5 inches.

Feature 2: The bonding agent is sized and positioned to overlap the interior surface of the vehicle body at a distance of at least 0.5 inches.

Feature 3: The bonding agent comprises a Sikaflex®-552 adhesive.

Feature 4: The flexible film laminate comprises a thickness of between about 0.005 inches and about 0.020 inches.

Feature 5: The vehicle window is configured to pass requirements of a FMVSS No. 226 standard during testing of the vehicle window.

Feature 6: The vehicle window retention system further comprises a frame-shaped support, said frame-shaped support comprising a curved first portion and a second portion, said second portion being shaped and sized to partially overlap said interior surface of said vehicle body.

Embodiment C: A method of an in situ retrofit of a side window in a vehicle to pass a FMVSS No. 226 standard, the side window being secured to an exterior surface of a vehicle body, the method comprising the steps: preparing a visible interior surface of the side window; directly adhering an adhesive surface of an optically transparent flexible film laminate to the visible interior surface, the optically transparent flexible film laminate having a thickness of between about 0.005 inches and about 0.020 inches; bonding, with an adhesive, a peripheral edge of the optically transparent flexible film laminate to an interior surface of the vehicle body, the adhesive overlapping the peripheral edge to a distance of at least 0.5 inches and overlapping the interior surface of the vehicle body to a distance of at least 0.5 inches; and air curing a bond between the optically transparent flexible film laminate and the interior surface for a duration of time sufficient to pass the FMVSS No. 226 standard during testing of the side window.

Feature 1: The step of preparing the visible interior surface of the side window comprises the step of spraying water onto the visible interior surface portion and the step of squeezing the water out from the visible interior surface portion.

Feature 2: The method further comprises the step of applying any one of heat, infrared light and ultra-violet light to the bond.

Embodiment D: A method of retrofitting a side window in a vehicle to meet FMVSS No. 226 standard, the side window being secured to an exterior surface of a vehicle body, the method comprising the steps:

directly adhering a flexible film laminate to a visible portion of an interior surface of the side window, the flexible film laminate having a thickness of between about 0.005 inches and about 0.020 inches; and bonding, with a bonding agent, a peripheral edge of the flexible film laminate to an interior surface of the vehicle body.

Embodiment E: A passenger vehicle window retention system, comprising: a vehicle body having each of an exterior surface and an interior surface; a window being secured to the exterior surface; a flexible film laminate being directly adhered to a visible portion of an interior surface of the window; and a bonding agent positioned in a direct contact with a peripheral edge of the flexible film laminate and in a direct contact with the interior surface of the vehicle body.

Feature 1: The bonding agent is sized and positioned to overlap the peripheral edge at a distance of at least 0.5 inches.

Feature 2: The bonding agent is sized and positioned to overlap the interior surface of the vehicle body at a distance of at least 0.5 inches.

Feature 3: The flexible film laminate comprises a thickness of between about 0.005 inches and about 0.020 inches.

Feature 4: The vehicle window retention system further comprises a frame-shaped support, said frame-shaped support comprising a curved first portion and a second portion, said second portion being shaped and sized to partially overlap said interior surface of said vehicle body.

Embodiment F: A vehicle comprising: a vehicle body; a side window being secured to an exterior surface of the vehicle body; an optically transparent flexible film laminate, the optically transparent flexible film laminate being disposed on an interior surface of the side window, the optically transparent flexible film laminate having a thickness of between about 0.005 inches and about 0.020 inches; and a bonding agent, the bonding agent being disposed in a direct contact with a peripheral edge of the optically transparent flexible film laminate and in a direct contact with the interior surface of the vehicle body.

Feature 1: the vehicle further comprises a frame-shaped support, said frame-shaped support comprising a curved first portion and a second portion, said second portion being shaped and sized to partially overlap said interior surface of said vehicle body.

Embodiment G: A method of converting a non-impact resistant side window in a vehicle to an impact resistant side window, the side window being secured to an exterior surface of a vehicle body, the method comprising the steps of: adhering a flexible film laminate to a visible interior surface of the window, the film having a thickness of between about 0.005 inches and about 0.020 inches; and bonding, with a bonding agent, a peripheral edge of the flexible film laminate to an interior surface of a vehicle body.

Embodiment H: A method of converting a non-impact resistant side window in a passenger vehicle to an impact resistant side window, the method comprising the steps of: adhering a flexible film laminate to an interior surface of the window, the flexible film laminate having a thickness of between about 0.005 inches and about 0.020 inches; and bonding, with a Sikaflex 552, a peripheral edge of the flexible film laminate to an interior surface of a vehicle body; the Sikaflex 552 overlapping the peripheral edge to a distance of at least 0.5 inches and overlapping the interior surface of the vehicle body to a distance of at least 0.5 inches.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present subject matter. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the claimed subject matter are approximations, the numerical values set forth in the specific examples are reported as precisely as possible.

Any numerical value, however, inherently contains certain errors necessarily resulting from the standard deviations found in their respective testing measurements.

The recitation of numerical ranges by endpoints includes all numbers subsumed within that range (e.g. 1 to 5 includes 1, 1.5, 2, 2.75, 3, 3.80, 4, and 5).

What is claimed is:

1. A method of retaining a window in a vehicle to pass FMVSS No. 226 standard, said window being secured, with an adhesive, to an exterior surface of a vehicle body, said method comprising the steps:

adhering a flexible film laminate to a visible interior surface portion of said window;

bonding, with a bonding agent, a peripheral edge of said flexible film laminate to an interior edge surface of a side opening in said vehicle body, said interior edge surface being inward of said visible interior surface portion of said window; and air curing a bond between said flexible film laminate and said interior edge surface for a duration of time sufficient to pass the FMVSS No. 226 standard during testing of said window.

2. The method, of claim 1, wherein the step of bonding said peripheral edge to said vehicle body comprises the step of selecting said bonding agent an adhesive.

3. The method, of claim 1, wherein the step of bonding said peripheral edge to said vehicle body comprises the step of overlapping at least 0.5 inches of said peripheral edge with said bonding agent.

4. The method, of claim 1, wherein the step of bonding said peripheral edge to said vehicle body comprises the step of overlapping at least 0.5 inches of said interior edge surface of said side opening of said vehicle body with said bonding agent.

5. The method, of claim 1, wherein the step of adhering said flexible film laminate comprises the step of directly adhering said flexible film laminate to said visible interior surface portion of said window.

6. The method, of claim 1, wherein the step of adhering said flexible film laminate comprises the step of selecting said flexible film laminate in a thickness of between about 0.005 inches and about 0.020 inches.

7. The method, of claim 1, wherein the step of adhering said flexible film laminate comprises the step of selecting said flexible film laminate with a thickness of about 0.008 inches.

8. The method of claim 1, further comprising the step of selecting said flexible film laminate as an optically transparent flexible film laminate.

9. The method of claim 1, further comprising the step of preparing said visible interior surface portion of said window prior to adhering said flexible film laminate thereto.

10. The method of claim 9, wherein the step of preparing said visible interior surface portion of said window comprises the step of spraying water onto said visible interior surface portion and the step of squeezing the water out from said visible interior surface portion.

11. The method of claim 1, further comprising the step of applying any one of heat, infrared light and ultra-violet light to said bond.

12. The method of claim 1, further comprising the step of bonding, with said bonding agent, a frame-shaped support prior to the step of air curing said bond.

13. The method of claim 1, further comprising the step of distributing, with a tool, said bonding agent around said peripheral edge of said flexible film laminate prior to the step of air curing said bond.

14. A passenger vehicle window retention system, comprising:
a flexible film laminate, said flexible film laminate being directly adhered to a visible portion of an interior surface of a vehicle window; and
a bonding agent, said bonding agent being positioned in a direct contact with a peripheral edge of said flexible film laminate and in a direct contact with an interior edge surface of a side opening in a vehicle body, said interior edge surface being inward of said visible portion of said interior surface of said vehicle window.

15. The passenger vehicle window retention system of claim 14, wherein said bonding agent is sized and positioned to overlap said peripheral edge at a distance of at least 0.5 inches.

16. The passenger vehicle window retention system of claim 14, wherein said bonding agent is sized and positioned to overlap said interior edge surface of said side opening of said vehicle body at a distance of at least 0.5 inches.

17. The passenger vehicle window retention system of claim 14, wherein said bonding agent comprises an adhesive.

18. The passenger vehicle window retention system of claim 14, wherein said flexible film laminate comprises a thickness of between about 0.005 inches and about 0.020 inches.

19. The passenger vehicle window retention system of claim 14, wherein the vehicle window is configured to pass requirements of a FMVSS No. 226 standard during testing of the vehicle window.

20. The passenger vehicle window retention system of claim 14, further comprising a frame-shaped support, said frame-shaped support comprising a curved first portion and a second portion, said second portion being shaped and sized to partially overlap said interior surface of said vehicle body.

21. A method, comprising:
adhering a flexible film laminate to an interior surface of a window secured to a vehicle body and covering an opening in the vehicle body, the interior surface visible through the opening;
bonding, with a bonding agent, a peripheral edge of the flexible film laminate to an interior edge surface of the opening, the interior edge surface being inward of the interior surface of the window; and
air curing a bond between said flexible film laminate and the interior edge surface.

22. The method of claim 21, wherein air curing comprises air curing the bond for a duration of time sufficient to pass a FMVSS No. 226 standard during testing of the window.

23. The method of claim 21, further comprising passing a test in accordance with a FMVSS No. 226 standard.

24. A method, comprising:
adhering a flexible film laminate to an interior surface of a non-impact resistant window covering a window opening in a vehicle, the flexible film laminate having a thickness of between about 0.005 inches and about 0.020 inches;
bonding, with an adhesive that cures on exposure to atmospheric conditions to form a durable elastomer, a peripheral edge of the flexible film laminate to an interior edge surface of the window opening, the adhesive overlapping the peripheral edge to a distance of at least 0.5 inches and overlapping the interior edge surface of the vehicle opening to a distance of at least 0.5 inches; and
converting the non-impact resistant window to an impact resistant window passing a FMVSS No. 226 standard.

* * * * *